US007784295B2

(12) United States Patent
McCormick et al.

(10) Patent No.: US 7,784,295 B2
(45) Date of Patent: Aug. 31, 2010

(54) TWO-ZONE FUZZY LOGIC LIQUID LEVEL CONTROL

(75) Inventors: Daniel Keir McCormick, York, PA (US); William Fred McQuade, New Cumberland, PA (US)

(73) Assignee: York International Corporation, York, PA (US)

( * ) Notice: Subject to any disclaimer, the term of this patent is extended or adjusted under 35 U.S.C. 154(b) by 0 days.

(21) Appl. No.: 12/577,353

(22) Filed: Oct. 12, 2009

(65) Prior Publication Data
US 2010/0030385 A1  Feb. 4, 2010

Related U.S. Application Data

(62) Division of application No. 11/232,265, filed on Sep. 21, 2005, now Pat. No. 7,621,141.

(60) Provisional application No. 60/612,308, filed on Sep. 22, 2004.

(51) Int. Cl.
F25B 41/04  (2006.01)

(52) U.S. Cl. .......................................... 62/218; 62/222

(58) Field of Classification Search .......... 62/129, 62/204, 218, 219, 220, 221, 222
See application file for complete search history.

(56) References Cited

U.S. PATENT DOCUMENTS

| 2,016,056 | A | 8/1935 | Small |
| 3,381,491 | A | 5/1968 | Harnish |
| 3,391,547 | A | 7/1968 | Kingston |
| 4,392,417 | A | 7/1983 | Johannsen |
| 5,138,846 | A | 8/1992 | Ogawa et al. |
| 5,156,013 | A | 10/1992 | Arima et al. |
| 5,224,352 | A | 7/1993 | Arima et al. |
| 5,259,210 | A | 11/1993 | Ohya et al. |
| 5,261,247 | A | 11/1993 | Knezic et al. |
| 5,263,333 | A | 11/1993 | Kubo et al. |
| 5,329,462 | A | 7/1994 | Friday et al. |
| 5,410,890 | A | 5/1995 | Arima |
| 5,419,146 | A | 5/1995 | Sibik et al. |
| 5,435,145 | A | 7/1995 | Jaster |
| 5,440,891 | A | 8/1995 | Hindmon, Jr. et al. |
| 5,442,926 | A | 8/1995 | Kawai et al. |
| 5,449,495 | A | 9/1995 | Goto |
| 5,463,876 | A | 11/1995 | Bessler et al. |
| 5,499,508 | A | 3/1996 | Arai et al. |

(Continued)

FOREIGN PATENT DOCUMENTS

JP   4115195   4/1992

(Continued)

*Primary Examiner*—Marc E Norman
(74) *Attorney, Agent, or Firm*—McNees Wallace & Nurick, LLC

(57) ABSTRACT

A level control algorithm for an HVAC refrigeration system is provided. The control algorithm utilizes a fuzzy logic methodology to automatically adjust a flow of refrigerant in the system to maintain a desired liquid level in the condenser. The fuzzy logic methodology incorporates a plurality of fuzzy logic control algorithms each having different membership functions and other control parameters that can provide different degrees of level control in the condenser. A particular fuzzy logic control algorithm is selected based on the amount a measured liquid level in the condenser deviates from the desired liquid level in the condenser.

14 Claims, 6 Drawing Sheets

U.S. PATENT DOCUMENTS

| | | |
|---|---|---|
| 5,546,756 A | 8/1996 | Ali |
| 5,549,152 A | 8/1996 | Davis, Jr. et al. |
| 5,655,379 A | 8/1997 | Jaster et al. |
| 5,734,593 A | 3/1998 | Madni et al. |
| 5,748,467 A | 5/1998 | Qin et al. |
| 5,809,794 A | 9/1998 | Sibik et al. |
| 5,809,795 A | 9/1998 | Beaverson et al. |
| 5,865,039 A | 2/1999 | Muller et al. |
| 5,910,158 A | 6/1999 | Park |
| 6,035,651 A | 3/2000 | Carey |
| 6,119,446 A | 9/2000 | Shon |
| 6,192,694 B1 | 2/2001 | Hiro et al. |
| 6,266,964 B1 | 7/2001 | Meyer et al. |
| 6,449,972 B2 | 9/2002 | Pham et al. |
| 6,453,690 B1 | 9/2002 | Kim |
| 6,530,236 B2 | 3/2003 | Crane et al. |
| 6,619,061 B2 | 9/2003 | Beaverson et al. |
| 6,637,222 B2 | 10/2003 | Moon et al. |
| 6,647,745 B1 | 11/2003 | Belanger |
| 6,662,583 B2 | 12/2003 | Pham et al. |
| 6,679,072 B2 | 1/2004 | Pham et al. |
| 6,694,222 B1 | 2/2004 | Kelly et al. |
| 7,490,477 B2 * | 2/2009 | Singh et al. .................. 62/129 |
| 2003/0029179 A1 | 2/2003 | Vander Woude et al. |
| 2003/0149675 A1 | 8/2003 | Ansari et al. |
| 2006/0059926 A1 | 3/2006 | McCormick et al. |

FOREIGN PATENT DOCUMENTS

| | | |
|---|---|---|
| JP | 7319554 | 12/1995 |
| JP | 10148301 | 6/1998 |
| WO | 88/00321 | 1/1988 |
| WO | 95/23944 | 9/1995 |
| WO | 97/39285 | 10/1997 |

* cited by examiner

FIG-8

|  | $e_n$ (1%) | | |
|---|---|---|---|
| $de_n$ (-3%/PRD.) | N=0 | Z=50 | P=50 |
| N=75 | C2=0 | C1=50 | X |
| Z=25 | C3=0 | X | O1=25 |
| P=0 | X | O3=0 | O2=0 |

RULE CONTRIBUTION
O1-O3=PULSE VALVE MOTOR OPEN
C1-C3=PULSE VALVE MOTOR CLOSED
X=NO ACTION (RULE NOT EVALUATED)

FIG-7

| $de_n$ \ $e_n$ | N | Z | P |
|---|---|---|---|
| N | C2 | C1 | X |
| Z | C3 | X | O1 |
| P | X | O3 | O2 |

RULE CONTRIBUTION
O1-O3=PULSE VALVE MOTOR OPEN
C1-C3=PULSE VALVE MOTOR CLOSED
X=NO ACTION (RULE NOT EVALUATED)

TWO-ZONE FUZZY LOGIC LIQUID LEVEL CONTROL

CROSS REFERENCE TO RELATED APPLICATIONS

This application is a divisional of U.S. application Ser. No. 11/232,265 filed Sep. 21, 2005, which claims the benefit of U.S. Provisional Application No. 60/612,308 filed Sep. 22, 2004, both of which are incorporated by reference herein.

BACKGROUND OF THE INVENTION

The present invention relates generally to controlling the level of liquid in a condenser of a chiller system. More specifically, the present invention relates to using fuzzy logic controls to properly position (open/close) a valve between the condenser and the evaporator to regulate the level of liquid in the condenser and to restrict the flow of refrigerant vapor to the evaporator.

In a chiller system, refrigerant gas is compressed in a compressor and delivered to a condenser where it is condensed to a liquid refrigerant. The liquid refrigerant from the condenser passes through an expansion device to lower the pressure of the refrigerant liquid before reaching an evaporator. In the evaporator, the liquid refrigerant is vaporized and returned to a suction inlet of the compressor to repeat the process.

The expansion device can incorporate a valve to regulate the flow of refrigerant between the condenser and the evaporator. The flow of refrigerant (liquid or gas) through the valve is dependent upon the pressures in the condenser and the evaporator and on the geometry and positioning of the valve. Ideally, the valve is positioned such that the resistance to fluid flow in the expansion device matches that required to minimize, if not totally eliminate, any flow of refrigerant gas to the evaporator.

If the valve is closed too far, the liquid in the condenser builds up creating the possibility of evaporator starvation, and if the valve is open too far the refrigerant liquid level in the condenser drops causing gas to bypass the condenser and flow to the evaporator. When gas bypass occurs, the compressor must perform more work to support the gas flow. However, no additional cooling capacity is obtained. This decreases the overall chiller operating efficiency.

U.S. Pat. No. 5,809,795, hereafter the '795 patent, discusses one technique for controlling the level of liquid in the condenser. The '795 patent uses a fuzzy logic control algorithm to attempt to control the level of liquid in the condenser. The control in the '795 patent uses a dead band region around the liquid level setpoint in the condenser to limit fluctuations in the system caused by feedback noise from the valve actuation process. However, this dead band region creates a significant control gap in the control logic for those setpoint deviations in the dead band region.

Therefore, what is needed is a fuzzy logic control algorithm to position the expansion valve of a chiller system to better maintain a desired liquid level in the condenser for optimum chiller system operating efficiency.

SUMMARY OF THE INVENTION

One embodiment of the present invention is directed to a liquid level control system for a refrigeration system having a compressor, a condenser, an evaporator, and an adjustable valve arrangement between the condenser and the evaporator. The control system includes a sensor configured and disposed to detect a level of liquid refrigerant in the condenser and to provide a liquid level signal corresponding to the detected level of liquid refrigerant in the condenser. The control system also includes a plurality of fuzzy logic control algorithms and a microprocessor. Each fuzzy logic control algorithm of the plurality of fuzzy logic control algorithms is configured to calculate an adjustment to a position of an adjustable valve arrangement. The position of the adjustable valve arrangement is used to control the level of liquid refrigerant in the condenser. The microprocessor is configured to sample the liquid level signal at a predetermined interval during operation of the refrigeration system and to select a fuzzy logic control algorithm from the plurality of fuzzy logic control algorithms based on a deviation of the sampled liquid level signal from a predetermined setpoint level. The microprocessor generates a control signal to position the adjustable valve arrangement of a refrigeration system using the selected fuzzy logic control algorithm.

Another embodiment of the present invention is directed to a method of controlling flow of refrigerant during operation of a refrigeration system to regulate a level of liquid refrigerant in a condenser of the refrigeration system. The method includes the steps of generating a liquid level signal corresponding to a level of liquid refrigerant in the condenser of the refrigeration system, generating an error signal using the liquid level signal and generating a rate signal using the error signal. The method also includes the steps of selecting a fuzzy logic control algorithm from a plurality of fuzzy logic control algorithms in response to the error signal and generating a control signal to position an adjustable valve arrangement in the refrigeration system using the selected fuzzy logic control algorithm. The error signal and the rate signal are inputs to the selected fuzzy logic control algorithm. Finally, the method includes the step of controlling the flow of refrigerant in the adjustable valve arrangement in response to the control signal to adjust a level of liquid refrigerant in the condenser to a predetermined liquid level.

Still another embodiment of the present invention is directed to a chiller system having a compressor, a condenser and an evaporator connected in a closed refrigerant loop and an expansion device disposed between the condenser and the evaporator. The expansion device has a valve arrangement to control flow of refrigerant through the expansion device. The chiller system also has a sensor arrangement disposed adjacent to the condenser to measure a level of liquid refrigerant in the condenser and a control panel configured to control operation of the valve arrangement with a control algorithm having a plurality of control zones to provide different levels of control. Each control zone of the plurality of control zones incorporates a fuzzy logic control algorithm. The control algorithm is configured to select a control zone of the plurality of control zones in response to a deviation of the measured level of liquid refrigerant in the condenser from a predetermined setpoint level value being within a predetermined range corresponding to the selected control zone.

One advantage of the present invention is that optimum chiller operating efficiency can be more consistently maintained at all load conditions.

Another advantage of the present invention is that the system response can be quickly dampened out when a disturbance occurs in the system.

Still another advantage of the present invention is that the level of liquid in the condenser can be more consistently maintained near a predetermined setpoint level and have a smaller maximum deviation from the predetermined setpoint level.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 7 illustrates a fuzzy logic truth table of an embodiment of the fuzzy logic control algorithm.

FIG. 8 illustrates a fuzzy logic truth table from one example of the present invention.

Whenever possible, the same reference numbers will be used throughout the figures to refer to the same parts.

DETAILED DESCRIPTION OF THE INVENTION

Figure 1:
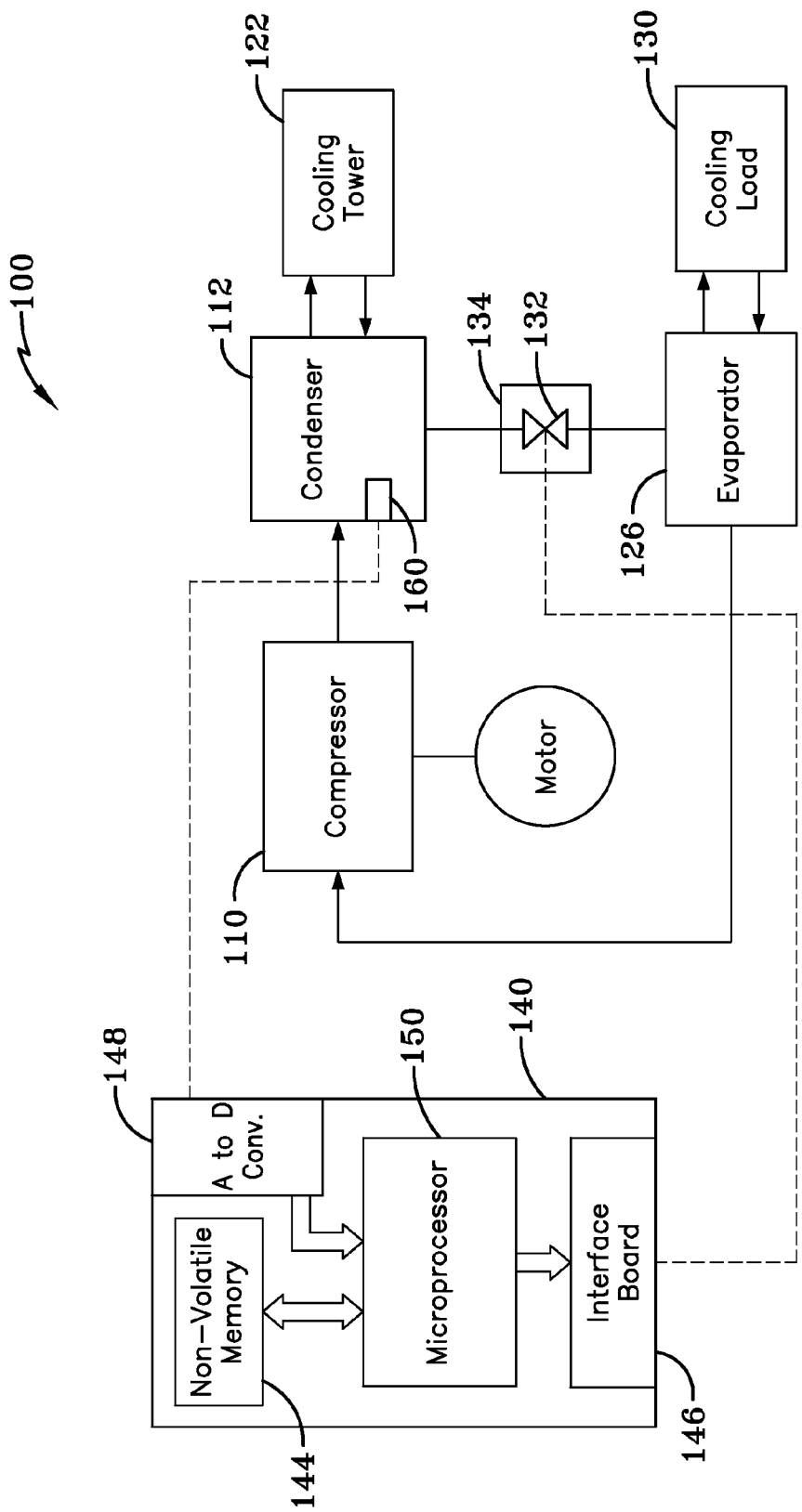
FIG. 1 illustrates schematically a chiller system of the present invention.
Figure 2:
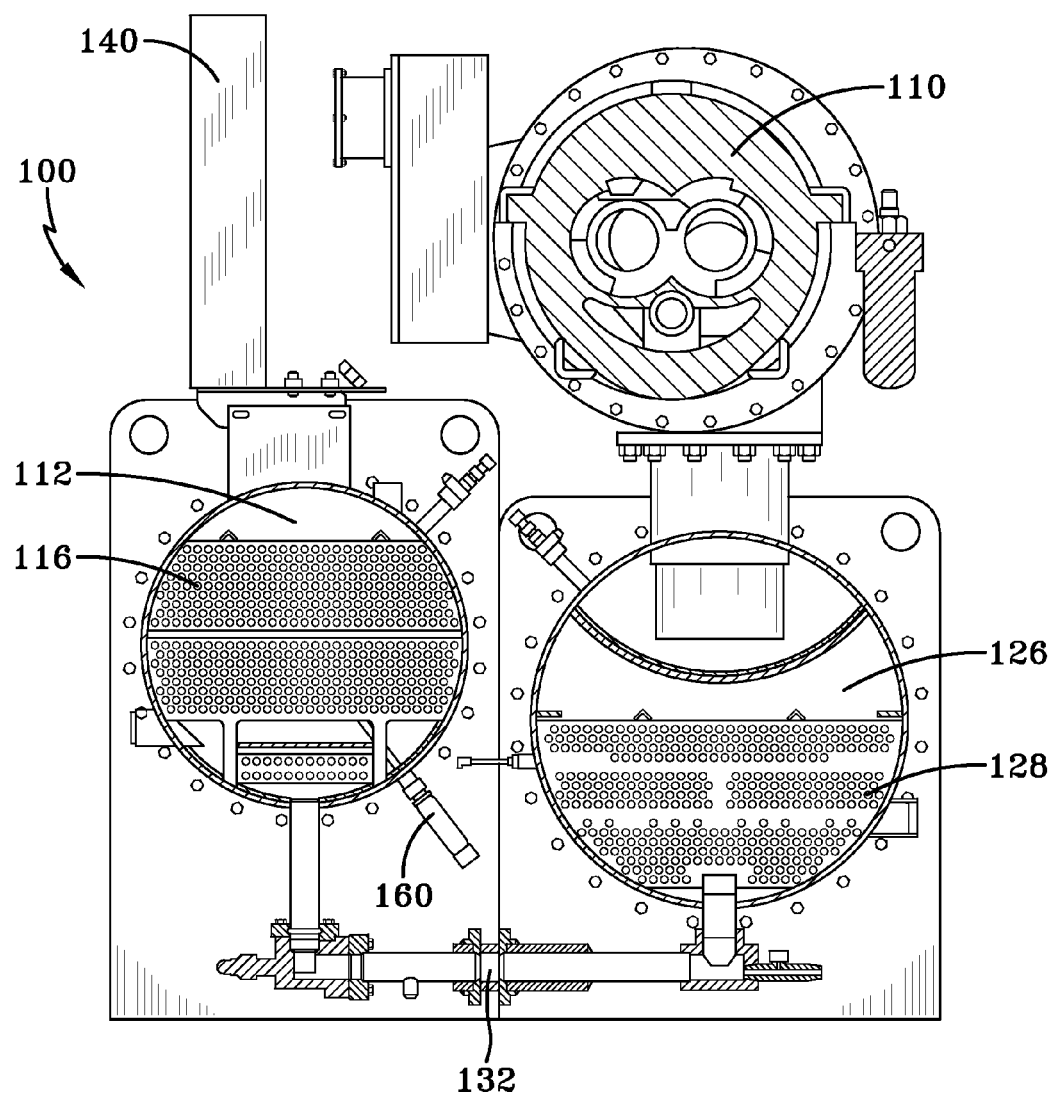
FIG. 2 illustrates a partial view of an embodiment of a chiller system of the present invention.

A general system to which the invention is applied is illustrated, by means of example, in FIGS. 1 and 2. As shown, the HVAC, refrigeration, or chiller system 100 includes a compressor 110, a condenser 112, a water chiller or evaporator 126, and a control panel 140. The control panel 140 includes an analog to digital (A/D) converter 148, a microprocessor 150, a non-volatile memory 144, and an interface board 146. The operation of the control panel 140 will be discussed in greater detail below. The conventional liquid chiller system includes many other features that are not shown in FIG. 1. These features have been purposely omitted to simplify the drawing for ease of illustration.

The compressor 110 compresses a refrigerant vapor and delivers it to the condenser 112. The compressor 110 can be any suitable type of compressor including a screw compressor, scroll compressor, reciprocating compressor, rotary compressor, and centrifugal compressor. The refrigerant vapor delivered by the compressor 110 to the condenser 112 enters into a heat exchange relationship with a fluid, e.g., air or water, and undergoes a phase change to a refrigerant liquid as a result of the heat exchange relationship with the fluid. In a preferred embodiment, the refrigerant vapor delivered to the condenser 112 enters into a heat exchange relationship with a fluid, preferably water, flowing through a heat-exchanger coil or tube bundle 116 connected to a cooling tower 122. The refrigerant vapor in the condenser 112 undergoes a phase change to a refrigerant liquid as a result of the heat exchange relationship with the fluid in the heat-exchanger coil or tube bundle 116. The condensed liquid refrigerant from condenser 112 flows through an expansion device 134, which includes a valve arrangement 132 to control the flow of refrigerant, to an evaporator 126. Preferably, the valve arrangement or restriction device 132 in the expansion device 134 is a multi-position valve, such as a variable orifice valve, butterfly valve or V-ball type valve, which can vary the resistance to flow and thus vary flow of refrigerant. However, it is to be understood that any suitable valve arrangement that can control the flow of refrigerant can be used.

A valve controller (not shown) is used to open and close the valve arrangement 132 (relative to its previous position) based on signals received from the control panel 140. The valve controller can include a motor, solenoid, or any other suitable actuator. In a preferred embodiment of the present invention, the valve controller or actuator has a motor that operates as long as a pulse (an acceptable AC signal applied for a given period of time) is present. In another embodiment, a DC signal may be applied for different types of motors. In still another embodiment of the present invention, the valve controller may receive valve position feedback from a feedback actuator in order to permit the valve controller to open or close the valve to a specific position or location. In a preferred embodiment of the invention, the microprocessor 150 sends a signal in the form of pulses to the valve controller, which causes the valve arrangement 132 to open or close in a corresponding direction proportional to the pulses received by the actuator. In the alternative, other signals and controllers can be used, provided that the valve arrangement 132 opens and closes proportionately to the received signal.

The evaporator 126 includes, for example, a heat-exchanger coil or tube bundle 128 having a supply line and a return line connected to a cooling load 130. A secondary liquid, e.g. water, ethylene or propylene glycol mixture, calcium chloride brine or sodium chloride brine, travels into the evaporator 126 via a return line and exits the evaporator 126 via a supply line. The liquid refrigerant in the evaporator 126 enters into a heat exchange relationship with the secondary liquid to lower the temperature of the secondary liquid. The refrigerant liquid in the evaporator 126 undergoes a phase change to a refrigerant vapor as a result of the heat exchange relationship with the secondary liquid. The vapor refrigerant in the evaporator 126 exits the evaporator 126 and returns to the compressor 110 by a suction line to complete the cycle. It is to be understood that any suitable configuration of evaporator 126 can be used in the system 100, provided that the appropriate phase change of the refrigerant in the evaporator 126 is obtained.

The system 100 includes a sensor 160 for sensing the liquid level of refrigerant or amount of liquid refrigerant in the condenser 112. The sensor 160 is preferably located within the condenser shell. However, the sensor 160 can be placed in any location that provides an accurate measurement of the liquid level in the condenser. The sensor 160 is preferably a level transducer probe, however, other types of probes or sensors may also be employed. The level transducer probes are directly inserted into the condenser receiver or shell and provide continuous measurement of the refrigerant level. The probes are capacitance type level transducers wherein the capacitance changes nearly proportionally with the refrigerant liquid level in the condenser 112 because the potential to store electricity is far greater for refrigerant liquid than that of vapor. The signal from the sensor 160, corresponding to the liquid level in the condenser 112, is transferred over to the control panel 140.

If necessary, the signal input to control panel 140 from sensor 160 is converted to a digital signal or word by A/D converter 148. Furthermore, if needed, the digital signal representing the level of liquid refrigerant in the condenser 112 can now be converted by the microprocessor 150 into a corresponding percentage of liquid refrigerant (LEVEL) in the condenser 112. For example, if LEVEL is determined to be 25%, then the condenser shell is one-quarter filled with liquid refrigerant.

In another embodiment, depending on the particular type of sensor being used, LEVEL may be indicative of the liquid level in the condenser relative to the sensor and not an indication of the actual level of the liquid in the condenser shell. For this embodiment, if LEVEL is determined to be 50%, then the liquid level of the condenser corresponds to a level that "covers" half of the sensor range. This LEVEL reading may correspond to 50% of the condenser shell being filled with liquid, but may also correspond to a greater or lower percentage of the condenser shell being filled with liquid.

The LEVEL value is then input into the control algorithm, which is described in more detail in the following paragraphs, to generate a control signal for the valve arrangement 132. The control signal for the valve arrangement 132 is provided to the interface board 146 of the control panel 140. The interface board 146 then provides the control signal to the valve arrangement 132, specifically the valve controller, to position the valve arrangement 132.

Microprocessor 150 uses a fuzzy logic algorithm to control the valve arrangement 132 through the interface board 146. In one embodiment, the fuzzy logic algorithm can be a computer program having a series of instructions executable by the microprocessor 150. The control algorithm determines, whether to cause the valve controller to further open the valve arrangement 132, further close the valve arrangement 132, or maintain the valve arrangement 132 in the same position, thereby regulating the flow of refrigerant to the evaporator 126 and correspondingly the level of liquid refrigerant in the condenser 112.

While it is preferred that the fuzzy logic control algorithm be embodied in a computer program and executed by the microprocessor 150, it is to be understood that the fuzzy logic control algorithm may be implemented and executed using digital and/or analog hardware by those skilled in the art. If hardware is used to execute the fuzzy logic control algorithm, the corresponding configuration of the control panel 140 can be changed to incorporate the necessary components and to remove any components that may no longer be required, e.g., the A/D converter 148.

The fuzzy logic control algorithm of the present invention has two or more control zones to control operation of the valve arrangement 132. The different control zones of the fuzzy logic control algorithm can use different membership functions, truth tables, fuzzification techniques and de-fuzzification techniques to provide different degrees of control to the valve arrangement 132, e.g., more aggressive controls versus less aggressive controls. The control zones are preferably defined with respect to a setpoint value. In other words, the particular control zone (and corresponding controls) that is used by the fuzzy logic algorithm is based on the deviation of a measured variable from a setpoint value. The dimensions of each of the zones can be preprogrammed, but are preferably selected by the operator of the chiller system to obtain the desired controls. In addition, once the control is switched to a control zone further from the setpoint value, a preselected timer can be engaged to direct when the control is permitted to switch back to the control zone nearer to the setpoint value. In a preferred embodiment of the present invention, the control zones of the fuzzy logic algorithm are based on the level of liquid refrigerant in the condenser 112. However, it is to be understood that any suitable system variable relating or corresponding to the condenser liquid level that can be operated at a predetermined setpoint value can be used to define the control zones.

Figure 3:
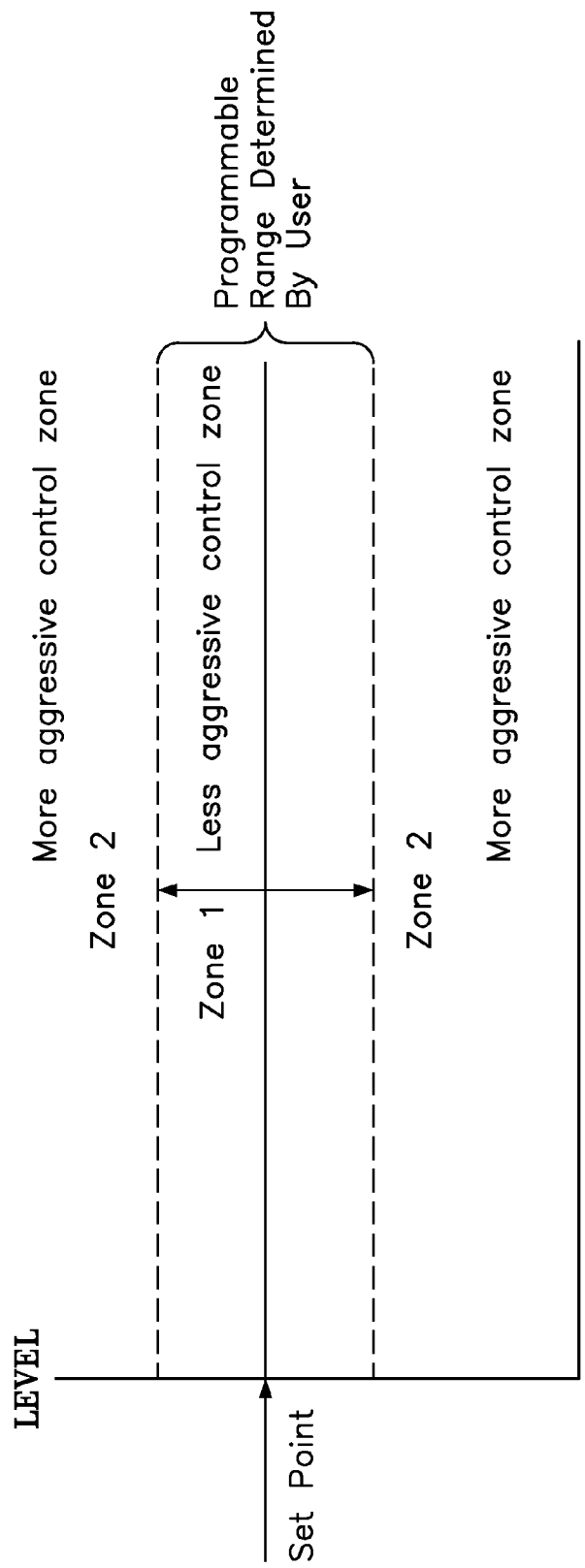
FIG. 3 graphically illustrates control zones of an embodiment of the fuzzy logic control algorithm.

FIG. 3 illustrates the positioning of two control zones in a preferred embodiment of the present invention. The two control zones are defined based on the deviation of a measured LEVEL from a predetermined liquid level setpoint. The first zone, Zone 1, is defined about the predetermined liquid level setpoint and corresponds to less aggressive fuzzy logic controls. Preferably, and as shown in FIG. 3, Zone 1 is defined based on equal deviations, both positive and negative, from the predetermined liquid level setpoint. The second zone, Zone 2, includes those areas that are not in the first zone and correspond to more aggressive fuzzy logic controls.

The fuzzy logic algorithm controls the desired position of the valve arrangement 132 by periodically sampling the LEVEL measured by the sensor 160 at pre-programmed intervals. For example, the programmable intervals may range from about 2 to about 30 seconds. By sampling the output of the sensor 160 and comparing the sensed values with a predetermined liquid level setpoint, and with one or more previously stored samples of the LEVEL, the microprocessor 150 can calculate an error value ($e_n$) and the rate of change of the error ($de_n$), according to known computer techniques. The fuzzy logic algorithm operates to correct the error value so that the error value approaches zero and the liquid level setpoint is maintained for most of the operational time of the system 100. During each sample interval, the fuzzy logic algorithm of the microprocessor 150 determines the degree of negative, positive and zero membership associated with each input (the error ($e_n$) and its rate of change ($de_n$)) by assigning a weight between zero (0) and one hundred (100) to each input. In another embodiment of the present invention the degree of membership or weight assigned to each of the membership functions can be between any suitable corresponding range, e.g., between zero (0) and one (1). Then, the fuzzy logic algorithm evaluates several "if then" rules that combine the degrees of membership into the appropriate course of action for the valve controller of valve arrangement 132.

The fuzzy logic algorithm utilizes as variable inputs both a LEVEL error ($e_n$) and the LEVEL error rate of change ($de_n$). The LEVEL error ($e_n$) is calculated as the LEVEL from the sensor 160 minus the predetermined liquid level setpoint and the LEVEL error rate of change ($de_n$) is the quantity of the present LEVEL error ($e_n$) minus the LEVEL error from the previous sample ($e_{n-1}$) for the corresponding sampling period.

Figure 4:
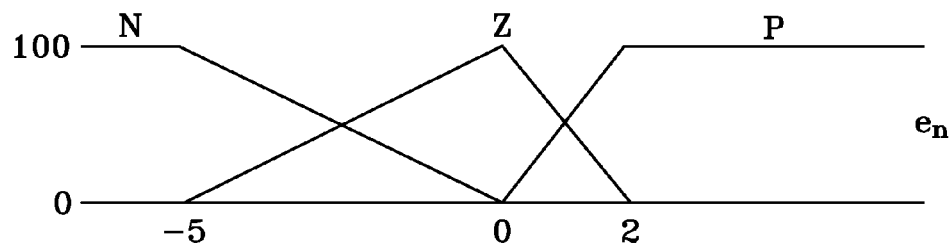
FIGS. 4-6 illustrate graphs of membership functions of inputs to an embodiment of the fuzzy logic control algorithm.
Figure 5:
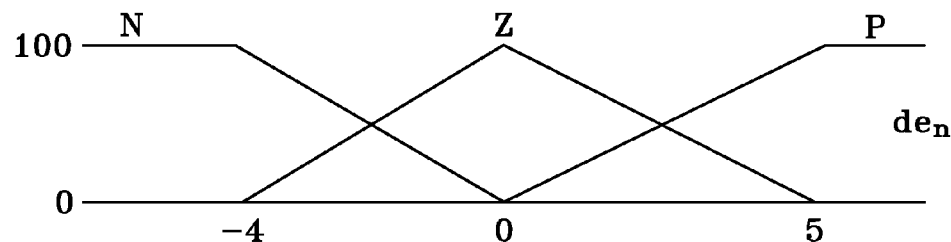
Figure 6:
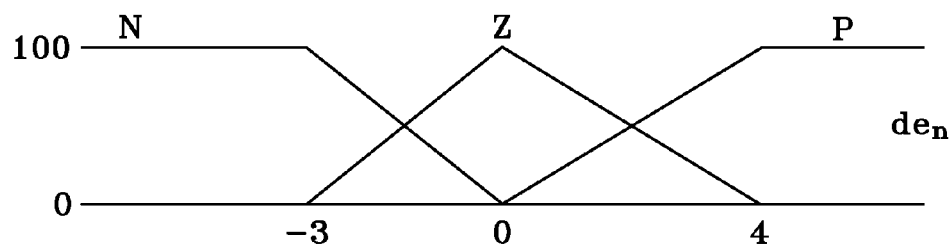

In a preferred embodiment, the fuzzy logic algorithm includes three membership functions for the LEVEL error rate of change ($de_n$) and the LEVEL error ($e_n$). However, it is to be understood that the fuzzy logic algorithm can have more or less membership functions for the LEVEL error rate of change ($de_n$) and the LEVEL error ($e_n$). FIG. 4 illustrates the Zone 1 and Zone 2 membership functions for the LEVEL error ($e_n$), FIG. 5 illustrates the Zone 1 membership functions for the LEVEL error rate of change ($de_n$) and FIG. 6 illustrates the Zone 2 membership functions for the LEVEL error rate of change ($de_n$) in a preferred embodiment. Each membership function determines in a linear fashion the degree to which the given input is zero, positive or negative. Full membership corresponds to a value of 100, partial membership corresponds to a value between 0 and 100 and no membership corresponds to a value of 0. The LEVEL error ($e_n$) and LEVEL error rate of change ($de_n$) membership functions are described by three linguistic variables Negative (N), Zero (Z) and Positive (P).

The membership functions shown in FIGS. 4-6 are not symmetric about zero and do not provide the same degree of membership for negative values as positive values when considering inputs of equal magnitude. In general, membership functions may or may not be symmetric. The membership functions for each zone are independently programmable and may be changed in the microprocessor 150. Thus, the sensitivity of both the LEVEL error ($e_n$) and the LEVEL error rate of change ($de_n$) membership functions may be modified, both symmetrically and asymmetrically, as desired, to optimize the system control. It is preferred to have programmable membership functions in order to have the flexibility to tune the control. A user can then change the membership functions applied by the fuzzy logic algorithm to obtain a desired system response. However, the membership functions may also be predetermined and non-programmable to provide the user with a simpler and easier to use control arrangement. Furthermore, the initial membership functions that are used for the fuzzy logic control algorithm (whether or not the membership functions can be subsequently changed by a user) are preferably individually tuned based on the specific type of valve arrangement 132 and other components that are incorporated into the system 100

The table shown in FIG. 7 shows a fuzzy logic truth table that diagrams how the microprocessor 150 evaluates the fuzzy logic rules according to one embodiment of the present invention. The fuzzy logic rules can be evaluated to one of three output linguistic variables Close (C), No Response/Not Evaluated (X), and Open (O). The output linguistic variables in the truth table are shown as numbered to distinguish them for illustration purposes.

As shown in the table, the rule combinations, described in the format of ($de_n$ membership function, $e_n$ membership function), are as follows: (Negative (N), Negative (N)), (Zero (Z), Negative (N)), and (Negative (N), Zero (Z)) result in a Close (C) output variable and contribute to a close command for the valve controller of valve arrangement 132 to increase the liquid level in the condenser 112; and (Positive (P), Zero (Z)), (Zero (Z), Positive (P)), and (Positive (P), Positive (P)) result in an Open (O) output variable and contribute to an open command for the valve controller of valve arrangement 132 to decrease the liquid level in the condenser 112. The remaining three rule combinations are not evaluated since they result in no action or no response. Therefore, a total of six rule combinations are evaluated utilizing a fuzzy inference minimum/maximum method. This method implies that a minimum "fuzzy AND" inferencing is performed first for each of the six rule combinations, i.e., the smaller of the values for the $de_n$ membership function and the $e_n$ membership function is selected for each of the six rule combinations. Then a "fuzzy OR" inferencing is performed in which the maximum value is found for the three rule combinations that result in the Close (C) output variable contribution, as well as for the three rule combinations that result in the Open (O) output variable contribution. The equations for determining the contribution of each output variable are provided below.

$$C=MAX(C1,C2,C3) \quad (1)$$

$$O=MAX(O1,O2,O3) \quad (2)$$

The resulting two maximum values need to be combined into a single output response, i.e., they need to be "de-fuzzified". Since the centroid method of de-fuzzification is more computationally intensive than required for this application, the singleton approach is preferably used. In the singleton approach, the single output response is determined by subtracting the close contribution maximum value from the open contribution maximum value. In an alternate embodiment, one or both of the close contribution maximum value and the open contribution maximum value can be multiplied by a corresponding scaling factor to further fine tune the control. The equation for determining the single output response (TOTAL COUNT) in a preferred embodiment is provided below.

$$TOTAL\ COUNT=O-C \quad (3)$$

After the TOTAL COUNT is determined, the output pulse width for the valve controller of valve arrangement 132 is then calculated by multiplying TOTAL COUNT by a maximum pulse width (MAXPULSE) and dividing the result by 100. The equation for determining the output pulse width (OPW) is provided below.

$$OPW=(TOTAL\ COUNT*MAXPULSE)/100 \quad (4)$$

The MAXPULSE variable corresponds to the largest possible pulse the control panel can enact for the valve controller of valve arrangement 132 and is preferably based on the valve stroke time for the valve arrangement 132. The MAXPULSE variable can be preprogrammed, but is preferably selected by a user to further tune the system response by enabling a pulse width adjustment to the output response. A larger value for the MAXPULSE variable results in a more rapid system response, but with less sensitivity, and a smaller value for the MAXPULSE variable results in a less rapid system response, but with a greater sensitivity. In addition, different values for the MAXPULSE variable can be selected for different control zones. The MAXPULSE variable can range from between about 0.5 seconds to about 12 seconds and preferably, the MAXPULSE variable is between about 2% and about 5% of the valve stroke time.

If the resultant value is less than zero, the valve controller of valve arrangement 132 receives a pulse width on the close signal (negative value) of equal value in seconds to the resultant value for that sample period to raise the refrigerant level. If the resultant value is positive, the valve controller of valve arrangement 132 receives a pulse width on the open signal (positive value) of equal value in seconds to the resultant value for that sample period to lower the refrigerant level.

The fuzzy inferencing of the present invention will be further clarified by the following example, which is intended to be purely exemplary of the invention. For this example, the control zone is the Zone 1 control zone shown in FIG. 3 and the corresponding membership functions used for the LEVEL error ($e_n$) and the LEVEL error rate of change ($de_n$) are the membership functions shown in FIGS. 4 and 5. In addition, the LEVEL error ($e_n$) is 1%, which, recall from above, is calculated as the LEVEL from the sensor 160 minus the predetermined liquid level setpoint, and the LEVEL error rate of change ($de_n$) is −3%, which, recall from above, is the quantity of the present LEVEL error ($e_n$) minus the LEVEL error from the previous sample ($e_{n-1}$).

As can be determined from FIG. 5, the LEVEL error rate of change ($de_n$) of −3% yields degrees of membership of 75 to N, 25 to Z and 0 to P. As can be determined from FIG. 4, the LEVEL error ($e_n$) of 1% yields degrees of membership of 0 to N, 50 to Z and 50 to P. The rules are combined by the minimum method and shown in the fuzzy logic truth table of FIG. 8. A comparison is made between the top and left side membership values of the truth table and the minimum value is placed in its respective place in the output section of the truth table. For example, the degree of membership assigned to the N membership function of $de_n$ (75) is combined with the degree of membership assigned to the Z membership function of $e_n$ (50) by performing a minimum fuzzy inferencing, i.e., a fuzzy AND routine, and results in a minimum value of 50 being assigned to C1. Next, the results of the combinations or fuzzy AND routines are combined using maximum fuzzy inferencing is performed, i.e., a fuzzy OR routine, as provided below in equations (5)-(6), which results in C=50 and O=25.

$$C=MAX(50,0,0)=50 \quad (5)$$

$$O=MAX(25,0,0)=25 \quad (6)$$

These results are then defuzzified using equations (3) and (4) discussed above and a MAXPULSE variable of 4 seconds to obtain an output response or pulse width (OPW) of −1 second. This output results in a 1 second pulse width on the close signal being executed during the current period. In other words, the output response is calculated and executed during the current sample interval and before the next sampling event.

Figure 9:
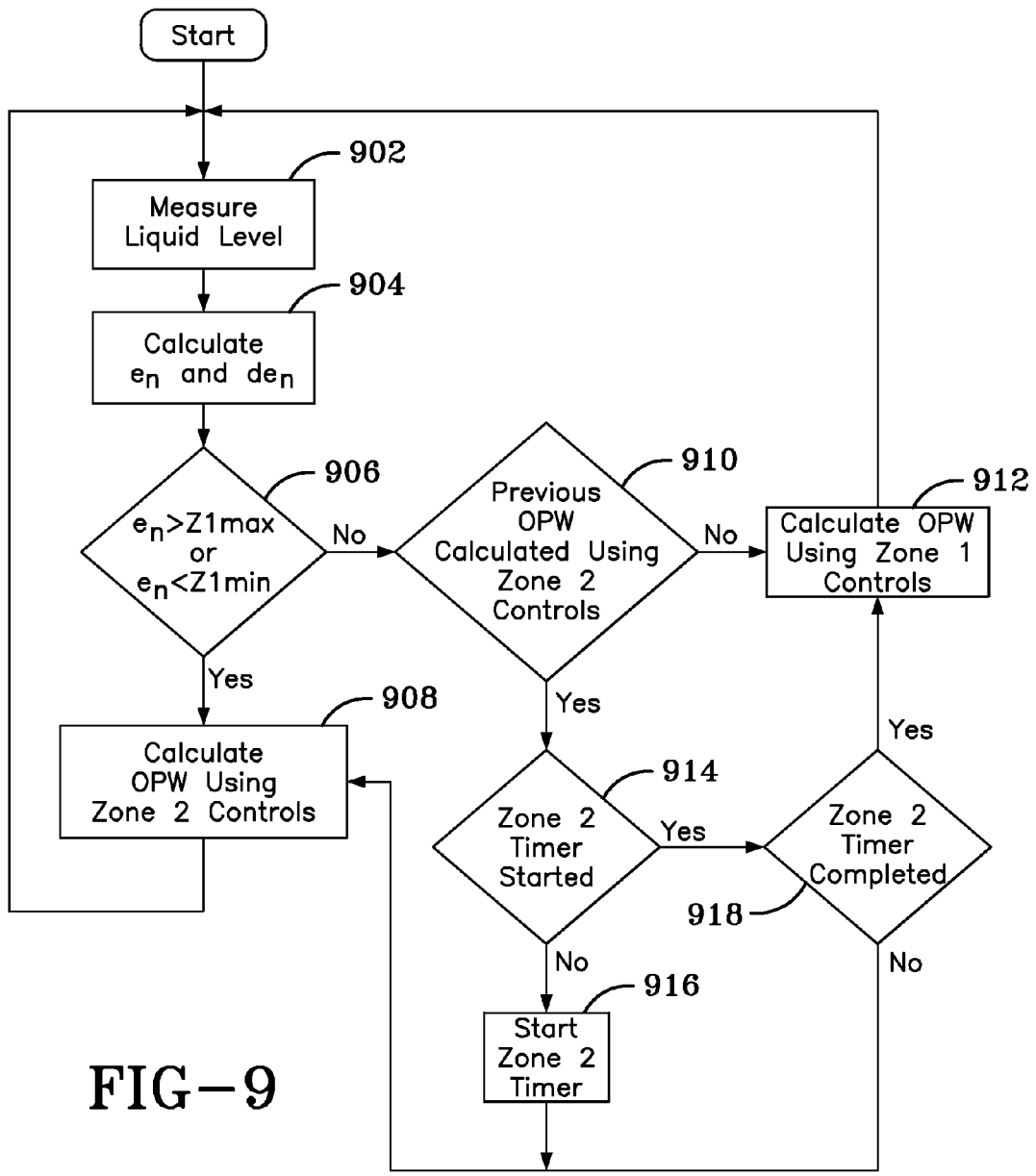
FIG. 9 illustrates a flow chart of the control process for the embodiment of the fuzzy logic control algorithm shown in FIG. 3.

FIG. 9 illustrates a control process of the present invention using a fuzzy logic control algorithm having two control zones as shown in FIG. 3. The process begins in step 902, where the liquid level in the condenser (LEVEL) is measured. Next, in step 904 the LEVEL error ($e_n$) and the LEVEL error rate of change ($de_n$) are calculated based on the measured LEVEL, the predetermined liquid level setpoint and the LEVEL error for the previous sample ($e_{n-1}$). The predetermined liquid level setpoint can be between about 30% and about 70% and is preferably about 50%.

In step 906, the LEVEL error ($e_n$) is compared to both a Zone 1 maximum value and a Zone 1 minimum value to determine if the LEVEL error ($e_n$) is greater than the Zone 1 maximum value or if the LEVEL error ($e_n$) is less than the Zone 1 minimum value. The Zone 1 maximum value can be between about 2.5% and about 15.5% and is preferably about 9%. The Zone 1 minimum value can be between about −2.5% and about −15.5% and is preferably about −9%. If either the LEVEL error ($e_n$) is greater than the Zone 1 maximum value or the LEVEL error ($e_n$) is less than the Zone 1 minimum value then the control proceeds to step 908, otherwise the control proceeds to step 910.

In step 908, the output pulse width (OPW) for the valve controller for the valve arrangement 132 is determined using a Zone 2 fuzzy logic control algorithm as discussed above. For example, the Zone 2 fuzzy logic control algorithm can use the membership functions shown in FIGS. 4 and 6, the fuzzy logic truth table shown in FIG. 7 and a MAXPULSE variable of 2.5 seconds. However, it is to be understood that any fuzzy logic control algorithm and corresponding parameters can be used for the Zone 2 fuzzy logic control algorithm. The control then returns to step 902 to measure the liquid level in the condenser.

Step 910 determines whether the previous output pulse width (OPW) for the valve controller for the valve arrangement 132 was determined using a Zone 2 fuzzy logic control algorithm. If the previous output pulse width (OPW) for the valve controller for the valve arrangement 132 used a Zone 2 fuzzy logic control algorithm then the control proceeds to step 914, otherwise the control proceeds to step 912. In step 912, the output pulse width (OPW) for the valve controller for the valve arrangement 132 is determined using a Zone 1 fuzzy logic control algorithm as discussed above. For example, the Zone 1 fuzzy logic control algorithm can use the membership functions shown in FIGS. 4 and 5, the fuzzy logic truth table shown in FIG. 7 and a MAXPULSE variable of 3.5 seconds. However, it is to be understood that any fuzzy logic control algorithm and corresponding parameters can be used for the Zone 1 fuzzy logic control algorithm. The control then returns to step 902 to measure the liquid level in the condenser.

If the previous output pulse width (OPW) for the valve controller for the valve arrangement 132 was determined using a Zone 2 fuzzy logic control algorithm, then the control process determines if a Zone 2 Timer was started in step 914. If the Zone 2 Timer was not started in step 914, then the control proceeds to step 916 and the Zone 2 Timer is started. After the Zone 2 Timer is started in step 916, the control proceeds to step 908 to determine the output pulse width (OPW) for the valve controller for the valve arrangement 132 using the Zone 2 fuzzy logic control algorithm.

Referring back to step 914, if the Zone 2 timer is started in step 914, then the control proceeds to step 918 to determine if the Zone 2 timer has completed its count. If the Zone 2 timer has completed its count, the control proceeds to step 912 to determine the output pulse width (OPW) for the valve controller for the valve arrangement 132 using the Zone 1 fuzzy logic control algorithm. If the Zone 2 timer has not completed its count, then the control proceeds to step 908 to determine the output pulse width (OPW) for the valve controller for the valve arrangement 132 using the Zone 2 fuzzy logic control algorithm.

The Zone 2 timer is used to ensure that the liquid level has returned and stabilized within the Zone 1 control zone after having left the Zone 1 control zone and entered the Zone 2 control zone. During the return transition from the Zone 2 control zone to the Zone 1 control zone, the Zone 2 fuzzy logic control algorithm is used to determine the output pulse width (OPW) for the valve controller for the valve arrangement 132 even though the LEVEL error ($e_n$) would dictate the use of the Zone 1 fuzzy logic control algorithm. This overriding of the basic control algorithm for the duration of the Zone 2 timer is to prevent large fluctuations in the LEVEL error ($e_n$) resulting from constant switching of the fuzzy logic control algorithms. The Zone 2 timer can be between about 30 seconds and about 180 seconds and is preferably about 100 seconds.

The present invention has been described in the context of a control algorithm for a valve arrangement in an expansion device that controls the flow of refrigerant from a condenser and to an evaporator in a chiller system, thereby controlling the level of liquid refrigerant in the condenser. However, the control algorithm of the present invention can be used in any type of refrigeration system to control the level of a fluid contained in a heat exchanger shell, e.g., condenser shell or evaporator shell, or in a receiver, e.g., economizer tank. To use the control algorithm in other types of refrigeration systems, some changes may have to be made to the membership functions and the sensor information that is used by the control algorithm to account for the particular configuration of the system to which the control algorithm is being applied.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of controlling flow of refrigerant during operation of a refrigeration system to regulate a level of liquid refrigerant in a condenser of the refrigeration system, the method comprising the steps of:

generating a liquid level signal corresponding to a level of liquid refrigerant in the condenser of the refrigeration system;

generating an error signal using the liquid level signal;

generating a rate signal over a predetermined interval using the error signal;

selecting a fuzzy logic control algorithm from a plurality of fuzzy logic control algorithms in response to the error signal;

generating a control signal to position an adjustable valve in the refrigeration system using the selected fuzzy logic control algorithm, wherein the error signal and the rate signal are inputs to the selected fuzzy logic control algorithm; and controlling the flow of refrigerant in the adjustable valve in response to the control signal to adjust the level of liquid refrigerant in the condenser to a predetermined liquid level.

2. The method of claim 1 wherein the step of controlling the flow of refrigerant in the adjustable valve includes:

opening the adjustable valve in response to the control signal being positive; and closing the adjustable valve in response to the control signal being negative.

3. The method of claim 1 wherein the step of generating an error signal includes subtracting a predetermined setpoint level value from the liquid level signal.

4. The method of claim 1 wherein the step of selecting a fuzzy logic control algorithm includes:

assigning each fuzzy logic control algorithm of the plurality fuzzy logic control algorithms a corresponding range of error values; and selecting the fuzzy logic control algorithm of the plurality fuzzy logic control algorithms in response to the error signal being within the corresponding range of error values for the selected fuzzy logic control algorithm.

5. The method of claim 1 wherein the step of generating a control signal to position an adjustable valve includes:

calculating a degree of membership for the rate signal in each of a first plurality of membership functions; and calculating a degree of membership for the error signal in each of a second plurality of membership functions.

6. The method of claim 5 wherein the step of generating a control signal to position an adjustable valve further includes:

evaluating a plurality of fuzzy logic rules using the calculated degrees of membership for the rate signal and the calculated degrees of membership for the error signal to generate a plurality of linguistic variables;

calculating at least one contribution for opening the adjustable valve using linguistic variables of the plurality of linguistic variables relating to an open command;

calculating at least one contribution for closing the adjustable valve using linguistic variables of the plurality of linguistic variables relating to a close command; and calculating an adjustment to the position of the adjustable valve using the at least one contribution for opening the adjustable valve and the at least one contribution for closing the adjustable valve.

7. The method of claim 6 wherein the step of generating a control signal to position an adjustable valve includes generating the control signal to position the adjustable valve with the calculated adjustment to the position for the adjustable valve and a maximum pulse width.

8. The method of claim 7 wherein the maximum pulse width is the maximum pulse output by a control panel for the adjustable valve and the maximum pulse is between 2% and 5% of a valve stroke time for the adjustable valve.

9. A chiller system comprising:

a compressor, a condenser and an evaporator connected in a closed refrigerant loop;

an expansion device disposed between the condenser and the evaporator, the expansion device having a valve to control flow of refrigerant through the expansion device;

a sensor disposed adjacent the condenser to measure a level of liquid refrigerant in the condenser;

a control panel being configured to control operation of the valve with a control algorithm having a plurality of control zones to provide different levels of control, each control zone of the plurality of control zones incorporating a fuzzy logic control algorithm; and wherein the control algorithm is configured to select a control zone of the plurality of control zones in response to a deviation of the measured level of liquid refrigerant in the condenser from a predetermined setpoint level value being within a predetermined range corresponding to the selected control zone.

10. The chiller system of claim 9 wherein the control algorithm generates a control signal to adjust a position of the valve to maintain the predetermined setpoint level value, the control signal being generated from a maximum pulse width signal and an adjustment signal from the corresponding fuzzy logic control algorithm of the selected control zone.

11. The chiller system of claim 10 wherein the control signal is configured to open the valve in response to the control signal being positive and the control signal is configured to close the valve in response to the control signal being negative.

12. The chiller system of claim 9 wherein the plurality of control zones include a first control zone and a second control zone, the predetermined range corresponding to the first control zone incorporating the predetermined setpoint level value.

13. The chiller system of claim 12 wherein the predetermined range corresponding to the first control zone has a maximum deviation from the predetermined setpoint level value of between about 2.5% and about 15.5% and a minimum deviation from the predetermined setpoint level value of between about −2.5% and about −15.5%.

14. The chiller system of claim 12 wherein the control panel further comprises:

a timer configured to count for a predetermined time period; and wherein the control algorithm is configured to start the timer in response to the selection of the second control zone and to operate in the second control zone until the predetermined time period expires.

* * * * *